(12) United States Patent
Miller

(10) Patent No.: US 6,418,594 B1
(45) Date of Patent: Jul. 16, 2002

(54) ASSIST DEVICE FOR GETTING INTO AND OUT OF AUTOMOBILES AND OTHER MODES

(76) Inventor: Troy Miller, 74 Canterbury Cir., Logan, UT (US) 84321

( * ) Notice: Subject to any disclaimer, the term of this patent is extended or adjusted under 35 U.S.C. 154(b) by 0 days.

(21) Appl. No.: 09/150,269

(22) Filed: Sep. 9, 1998

(51) Int. Cl.[7] .............................................. A44B 11/25
(52) U.S. Cl. ......................................... 24/298; 24/302
(58) Field of Search ........................ 24/298, 302, 164, 24/165, 197, 481, 136 R, 30.5 R; 119/793, 795, 797; 294/153

(56) References Cited

U.S. PATENT DOCUMENTS

| | | | | |
|---|---|---|---|---|
| 3,486,672 A | * | 12/1969 | Esopi ........................ 24/302 X |
| 5,542,433 A | * | 8/1996 | Saupe ........................ 128/869 |
| 5,581,853 A | * | 12/1996 | Miller et al. ................... 24/302 |
| 5,806,467 A | * | 9/1998 | Arakawa ................. 119/797 X |
| 6,032,916 A | * | 3/2000 | Holliday .................... 24/302 X |

* cited by examiner

Primary Examiner—Robert J. Sandy
(74) Attorney, Agent, or Firm—Jones, Waldo, Holbrook & McDonough; Michael W. Starkweather; Brent T. Winder

(57) ABSTRACT

A device for assisting a user with ingress and egress into and out of automobiles and other modes of transportation that includes an attaching member for attaching the device to the mode of transportation and a connecting member which includes a handle that the user grasps during ingress and egress from the mode of transportation and an adjusting means that allows the device to be strategically located for a user's particular needs or preferences.

4 Claims, 2 Drawing Sheets

ASSIST DEVICE FOR GETTING INTO AND OUT OF AUTOMOBILES AND OTHER MODES

BACKGROUND

1. Field

This invention relates generally to the field of medical and ambulatory assist devices and equipment, and more specifically, to a novel device to assist individuals getting into and out of automobiles and other modes of transportation, as well as being capable of lifting and carrying objects of various dimensions and weights.

2. Prior Art

Devices and methods for assisting individuals from getting into and out of automobiles and other modes of transportation are relatively well known in the art. These devices include both those that are fixated to the automobile or other mode of transportation in some manner and those that the individual in need of assistance carries with him or her.

In most instances, those devices that are fixated to an automobile or other mode of transportation, include handles or some other form of apparatus that is attached somewhere near the door opening. Some of these devices have handles that are retractable or fold out of the way when not in use. In use, the user grabs a hold of the handle and either lowers or pulls himself or herself into or out of an automobile or other mode of transportation.

The type of devices that the user carries with him or her include walkers, canes, crutches and other types of portable assist devices. The user approaches an automobile or other mode of transportation using this type of device. When the user reaches the automobile or other mode of transportation, he or she uses this portable device to sit down in the automobile or other mode of transportation. Once in the automobile or other mode of transportation, the user places the portable device somewhere in the automobile or other mode of transportation until it is needed to assist the user out of the automobile or other mode of transportation. When the user needs to get out of the automobile or other mode of transportation, the user places the device outside the vehicle and attempts to pull himself or herself out of the vehicle.

While adequate for a number of applications, the type of devices just described also include a number of disadvantages. For example, the devices that are fixated to the automobile or other mode of transportation cannot easily be removed therefrom and may constitute an obstruction in some instances. This can become a problem if the device is not positioned properly or if the device prevents people or objects from moving into or out of the automobile or other mode of transportation.

Another disadvantage with this type of device is that it is not easily adjustable, if it is adjustable at all, with respect to its positioning within the automobile or other mode of transportation. Thus, the user does not have the ability to position the device within the automobile or other mode of transportation to fit his or her body type, unique infirmity or need. This problem may require a user to hire the services of a mechanic in order to position the device in the automobile or other mode of transportation. However, even if positioned by such a mechanic, it would require a similar effort to make any further adjustments to the location of the device.

Still another disadvantage of this type of device is that it is not easily adjustable, it at all, once it is fixated within the automobile or other mode of transportation. Once the device is anchored in the automobile or other mode of transportation, it cannot easily be adjusted, if at all, in terms of the length of or positioning of the handle. Thus, the user cannot lengthen or shorten the handle in relation to its anchoring to the automobile or other mode of transportation in order to accommodate the individual user's body type, unique infirmity or need.

A still further disadvantage is that the handle of most comparable devices is that they are awkward in shape and difficult for individuals using the device to grab a hold of and to adjust their hand positions once they have grabbed the handle. That is, the handles of most devices do not resemble any type of device that the users are familiar with or used to using. Further, the handle of most of these devices requires that the user rely solely upon the strength in his or her hand and does not allow the user to lock his or her arm into the device in order to acquire the strength to move into and out of the automobile or other mode of transportation.

Still a further disadvantage of this type of device is that they are cost prohibitive both to purchase and to adjust. In most instances, these devices are not available to most individuals who stand in need of these devices.

While adequate for a number of applications, the portable devices, described above, also include a number of disadvantages. For example, these devices are not fixated to the automobile or other mode of transportation and the user must carry them with him or her and store the device in the automobile or other mode of transportation when not in use.

Another disadvantage of the portable type devices is that they are not attached to any part of the automobile or other mode of transportation and as a result they are not stable. The user must attempt to balance the device while they are trying to get into or out of the automobile or other mode of transportation. If the user loses his or her balance there is little or no chance of recovery and the user might sustain serious injury.

Still another disadvantage of the portable devices is that while in use, assuming that the user is able to maintain proper balance, the user must awkwardly try and push himself or herself up out of the automobile or other mode of transportation using the device. Conversely, in order to lower himself or herself into the automobile or other mode of transportation the user must applying lessening pressure to the top of the device and hope that he or she neither loses balance or otherwise sustains an injury while trying to get into the automobile or other mode of transportation. The result of using this type of a device to get into an automobile or other mode of transportation is that the user is not able to maintain enough pressure on the device to keep their rate of decent thereinto constant and he or she will generally have to essentially fall the last few inches into the automobile or other mode of transportation.

BRIEF SUMMARY AND OBJECTS OF THE INVENTION

In light of the problems described in the prior art, the present invention seeks to accomplish and realize, among other things, the following objects and advantages.

A principal object of the present invention is to provide a novel device to assist individuals getting into or out of an automobile or other mode of transportation that can easily be removed from or attached thereto and that does not constitute and obstruction to said individuals.

Another major object of the present invention is to provide a novel device to assist individuals getting into or out of an automobile or other mode of transportation that is easily adjustable with respect to its positioning within the automobile or other mode of transportation to take into consideration the particular needs or infirmities of an individual user.

Still another major object of the present invention is to provide a novel device to assist individuals getting into or out of an automobile or other mode of transportation that is easily adjustable by lengthening or shortening the length of the handle to accommodate the particular needs or infirmities of an individual user.

A further major object of the present invention is to provide a novel device to assist individuals getting into or out of an automobile or other mode of transportation that is ergonomically designed in order for the user to easily grasp the handle and to adjust their hand position thereon during use.

Yet another major object of the present invention is to provide a novel device to assist individuals getting into or out of an automobile or other mode of transportation that is inexpensive to purchase and is therefore available to most individuals who stand in need of these devices.

An additional important object of this invention is to provide a novel device to assist individuals getting into or out of an automobile or other mode of transportation that, while fully adjustable, can remain permanently fixed to the automobile or other mode of transportation such that the user does not have to carry the device with him or her.

Still another principal object of the present invention is to provide a novel device to assist individuals getting into or out of an automobile or other mode of transportation that is stable and allows the user to maintain his or her balance while using the device and that is safe to use thus preventing injury while being used.

Another important object of this invention is to provide a novel device to assist individuals getting into or out of an automobile or other mode of transportation that provides a proper mechanical advantage for the user so that he or she can more easily use the device.

Still another important principal object of the present invention is a novel device to assist individuals getting into or out of an automobile or other mode of transportation that allows the user to remain in control of their ascent or descent throughout the entire process of using the device.

These and other objects and advantages of the invention will become more fully apparent from the description and the claims which follow, or may be learned by the practice of the invention.

Accordingly, the present invention comprises generally, a handle, an attaching member and a connecting member. Advantageously, the handle includes a tube like structure through which the connecting member passes, as discussed below. Alternatively, the handle may, in another embodiment, consist of a flexible material that is securely fixed to the connecting member, as discussed below.

At present preference, the attaching member comprises first and second ends. The first end of the attaching means is unadjustably fixed or secured to the connecting member. The second end of the attaching member is advantageously equipped with an adjusting member for adjusting the length of the attaching member and for disconnecting the second end of the attaching member from the connecting member in order to attach the device to an automobile or other mode of transportation.

In its present preference, the adjusting member comprises a first and second part. Each first and second part further comprises first and second ends. The first end of the first part of the adjusting member comprises a series of holes or loops through which the second end of the attaching member pass and anchor. The series of holes or loops in the first end of the first part of the adjusting member are advantageously situated to allow the length of the attaching member to be adjusted as needed. The second end of the first part of the adjusting member comprises a series of prong like members extending away from first end of the first part of the adjusting member. The series of prong like members are advantageously designed to fit within and anchor to the first end of the second part of the adjusting member. The first end of the second part of the adjusting member comprises an opening advantageously designed to accept and anchor the prong like members on the second end of the first part of the adjusting member. The second end of the second part of the adjusting member comprises one or a series of holes or loops through which the second end of the connecting member passes, as discussed below, and is unadjustably fixed or secured thereto.

In its most common preference, the connecting member comprises first and second ends. The first end of the connecting member connects to or is contiguous with the first end of the attaching member. The second end of the connecting member connects to the opposite end of the adjusting member for adjusting the length of attaching member located at the terminus of the second end of the attaching member. The first and second ends of the connecting member are fixedly attached to each other just below the adjusting member located at the terminus of the second end of the attaching member. Advantageously, the connecting member passes through the interior of the tube like handle, above described. In another preferred embodiment, the handle may consist of a flexible material securely fixed to the connecting member at its approximate midpoint.

In its most common usage, the attaching member is looped through or around the desired portion of an automobile or other mode of transportation. Preferably, the attaching member is looped around the metal portion of the window frame on the door of an automobile or other mode of transportation. Advantageously, the attaching member is comprised of a material that is flexible and that does not interfere with the operation of the automobile's window when in place. The device is then adjusted appropriately by either lengthening or shortening the attaching member by means of the adjusting member. The user then uses the device by opening the automobile's door, or the door of the other mode of transportation, and then by grabbing a hold of the handle and either lowering themselves into or raise themselves out of the automobile or other mode of transportation.

BRIEF DESCRIPTION OF THE DRAWINGS

In order that the manner in which the above recited and other advantages and objects of the invention are obtained can be appreciated, a more specific description of the invention briefly described above will be rendered by reference to the specific embodiments thereof which are illustrated in the appended drawings. Understanding that these drawings depict only typical embodiments of the invention and are not therefore to be considered limiting its scope, the invention will be described and explained with additional specificity and detail through the use of the accompanying drawing in which.

DETAILED DESCRIPTION OF THE DRAWINGS

Figure 1:
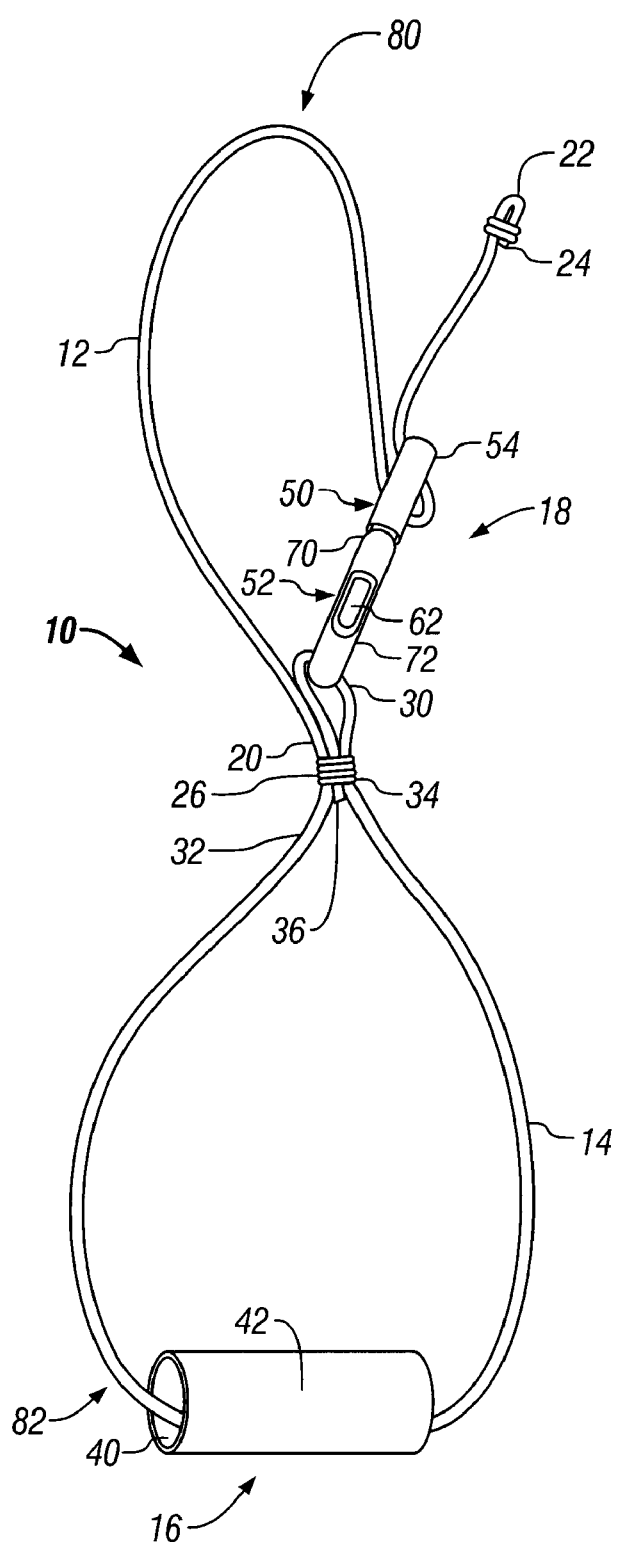
FIG. 1 is a front perspective view of an embodiment of the invention, according to the principals and specific ions of the invention contained herein.

Reference is now made to the drawings wherein like numerals are used to designate like component parts throughout. The assist device for getting into and out of automobiles and other modes of transportation of the present invention which is presently preferred, generally designated 10, includes an attaching member 12, a connecting member 14, a handle 16, and an adjusting member 18. Preferably, the attaching member 12 and connecting member 14 consist of a continuous piece of material, but are considered separately in this patent for sake of clarity and because an embodiment of the present invention may call for separating the members. Each of these components will be described in greater detail hereafter.

The attaching member 12 is preferably a flexible member which is generally constructed of a wide and strong material such as nylon webbing, as shown in the drawings. Other strong flexible materials are also contemplated and fall within the purview of this patent. Additionally, the contemplated material may take on different shapes and dimensions and the same are also contemplated and likewise fall within the purview of this patent. The attaching member 12 includes a first end and second end 20 and 22, respectively. The terminus 24 of the second end 22 of the attaching member 12 is folded back over on itself and permanently anchored. The first end 22 of the attaching member 12 is permanently anchored 26 to the connecting member 14, as discussed below. The first end 20 of the attaching member 12 is wound through the first part of the adjusting member 18, as discussed below. One skilled in the art will recognize that the manner in which the first end 20 of the attaching member 12 creates friction and prevents the attaching member 12 from slipping while in use.

As will be explained more fully and in greater detail hereafter, the attaching member 12 is looped around the window frame or other stationary object in an automobile or other mode of transportation. This is accomplished, as discussed below, by releasing the first part of the adjusting member 18 from the second part of the adjusting member 18, looping the first end 22 of the attaching member 12 around the stationary object and then reinserting and reattaching the first part of the adjusting member 18 into the second part of the adjusting member 18.

The connecting member 14 is likewise preferably a flexible member which is generally constructed of a wide and strong material such as nylon webbing, as shown in the drawings. Other strong flexible materials are also contemplated and fall within the purview of this patent. Additionally, the contemplated material may take on different shapes and dimensions and the same are also contemplated and likewise fall within the purview of this patent. The connecting member 14 includes first and second ends 30 and 32, respectively. The second end 32 of the connecting member 14, as discussed in more detail below, passes through the second part of the adjusting member 18 and folds back on itself where it is permanently anchored 34. One skilled in the art will recognize that this configuration permanently affixes the second part of the adjusting member 18 to the second end 32 of the connecting member 14. The first end 30 of the connecting member 18 is permanently affixed 36 to the second end 32 of the connecting member 18 just below where the second end 32 of the connecting member 12 permanently attaches 34 to the second part of the adjusting member 18. The connecting member 14 passes through the center of the handle 16.

The handle 16 is preferably a flexible member which is generally constructed of rubber or plastic with a material covering, as shown in the drawings. Other strong flexible materials 44 such as nylon are also contemplated and fall within the purview of this patent. Further, in some preferred embodiments the handle 16 may be constructed of a rigid material such as wood, metal, plastic or other strong rigid material all of which are contemplated and likewise fall within the purview of this patent. The handle 16 includes inside and outside surfaces 40 and 42, respectively. The connecting member 14 runs through the handle 16 and comes in contact with the inside surface 40.

The adjusting member 18 is preferably a rigid member which is generally constructed of hard plastic, as shown in the drawings. Other strong rigid materials such as wood, metal or other material are also contemplated and fall within the purview of this patent. The adjusting member 18 includes first and second parts 50 and 52, respectively. The first part 50 of the adjusting member 18 includes first and second ends 54 and 56, respectively. The first end 54 of the first part 50 of the adjusting member 18 includes a series of holes or openings 60 through which the second end 22 of the attaching member 12 passes and locks. The second end 56 of the first part 50 of the adjusting member 18 includes a series of prongs 62 that extend longitudinally away from the first end 54 of the first part 50 of the adjusting member 18. The second part 52 of the adjusting member 18 includes first and second ends 70 and 72, respectively. The first end 70 of the second part 52 of the adjusting member 18 contains an opening 74 designed to accept the prongs 62 located on the second end 56 of the first part 50 of the adjusting member 18. The second end 72 of the second part 52 of the adjusting member 18 includes a hole or opening or series of holes or openings 76 through which the first end 30 of the connecting member 14 passes prior to folding back on itself and permanently anchoring 34. The second part 52 of the adjusting member 18 includes two holes 78 on each side roughly midway between the first and second ends 70 and 72, respectively. These holes 78 are designed to accept the ends of the two outer prongs 62 on the second end 56 of the first part 50 of the adjusting member 18 when the prongs 62 are inserted into the opening 74 on the first end 70 of the second part 52 of the adjusting member 18. In operation, the ends of the two outer prongs 62 slip into and lock into the holes 78, thus anchoring together the first and second parts 50 and 52 of the adjusting member 18.

Figure 2:
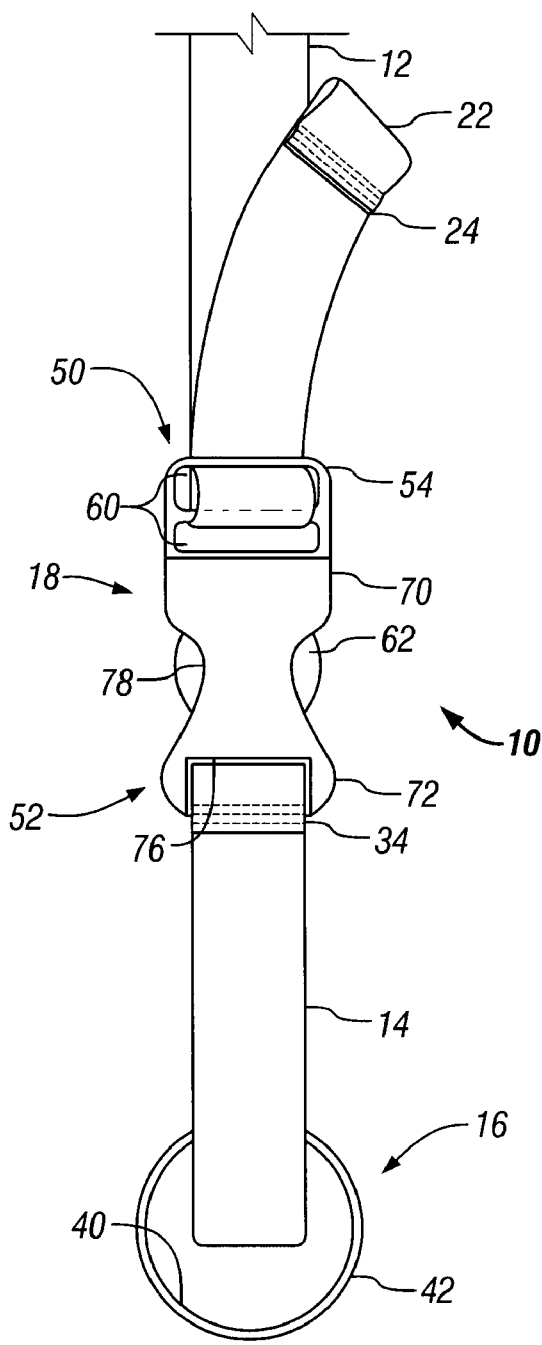
FIG. 2 is a side elevational view of the embodiment in FIG. 1 illustrating the adjusting member.
Figure 3:
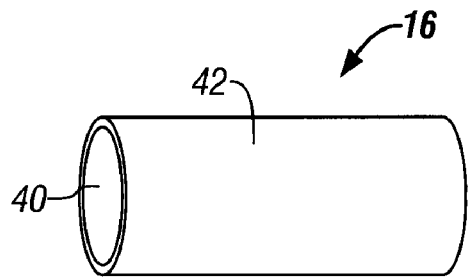
FIG. 3 is a partial enlarged perspective view of the embodiment of FIG. 1 illustrating a preferred embodiment of the handle.
Figure 4:
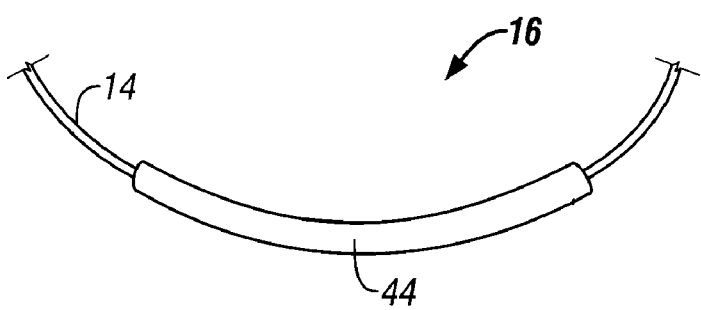
FIG. 4 is a partial enlarged perspective view of the embodiment of FIG. 1 illustrating an additional preferred embodiment of the handle.

Referring now to FIGS. 1 and 2, it will be seen that the attaching member 12, in combination with the adjusting member 18, forms a loop 80. One skilled in the art will immediately recognize that the loop 80 formed by the attaching member 12 and the adjusting member 18 can be advantageously used to attach the device to the window frame or other stationary object on an automobile or other mode of transportation.

One skilled in the art will also immediately recognize that the size of the loop 80 formed by the attaching member 12 and the adjusting member 18 can be manipulated by adjusting the second end 22 of the attaching member 12 through the holes or openings 60 in the first end 54 of the first part 50 of the adjusting member 18. One skilled in the art will understand that by pulling on the second end 22 of the attaching member 12 the loop 80 formed by the attaching member 12 and the adjusting member 18 will decrease in size proportionately. Conversely, the loop 80 may be increased in size by pulling the attaching member 12 through the holes or openings 60 in the first end 54 of the first part 50 of the adjusting member 18 in a direction opposite of the second end 22 of the attaching member 12.

Referring now to FIG. 1, it will be seen that the connecting member 14 forms a loop 82. One skilled in the art will recognize that because the first and second ends 32 and 34 of the connecting member 14 are permanently fixed to each other, the loop 82 remains a constant size. The connecting member 14 passes through the center of the handle 16. One skilled in the art will understand that because of the device's configuration, the handle 16 will remain approximately in the center of the connecting member 14.

Figure 5:
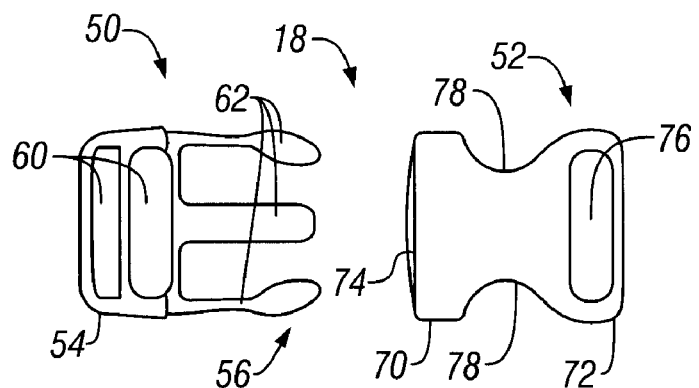
FIG. 5 is an exploded front view of an embodiment of FIG. 1 illustrating the adjusting member.

Referring now to FIGS. 1, 2 and 5, it will be seen that the first and second parts 50 and 52 of the adjusting member 18 are designed to both lock together and separate. One skilled in the art will recognize that by unlocking the first and second parts 50 and 52 of the adjusting member 18 the attaching member 12 can be looped around a window frame or other stationary object on an automobile or other mode of transportation at which point the first and second parts 50 and 52 of the adjusting member 18 can be locked back together thus affixing the device in place. One skilled in the art will also recognize that the attaching member 12 is constructed of material that, if the device 10 is attached to a window frame, will not interfere with the operation of the window. In use, one skilled in the art will recognize the necessity of placing the window in the up position so as to lock the device 10 in place and avoid any sliding that might occur if the window were not in the up position.

One skilled in the art will recognize that once the device 10 is locked in place by means of the attaching member 12 and the adjusting member 18, the user can grab a hold of the handle 42 and apply body weight to the device 10 as necessary to lower or raise himself or herself either into or out of an automobile or other mode of transportation.

Another preferred embodiment of the present invention is for the purpose of carrying loads of various weights and dimensions. In this embodiment, one skilled in the art will recognize that the attaching member 12, in combination with the adjusting member 18, can be looped around a load of varying weights or dimensions. Once the load is locked in place, one skilled in the art will readily understand that the load can be transported if the user grasps the handle 16 and applies upward pressure to the device 10 equivalent to or greater than the weight of the object to be carried. In this manner the device 10 can be used to carry loads of varying weights and dimensions.

Although the preferred embodiments of the present invention have been illustrated and described, it is to be understood that the present disclosure is made by way of example and illustration and various other embodiments are possible without departing from the subject matter coming within the scope of the following claims, which subject matter is regarded as the invention.

What is claimed:

1. A device for assisting a user with ingress and egress into and out of automobiles and other modes of transportation, the device comprising:

an attaching member for temporarily attaching the device to a mode of transportation including an adjusting means, and a connecting member including a handle to be grasped by the user for support during ingress and egress, such that the attaching and connecting members form connected loops in the general shape of a figure eight, and such that the adjusting means allows the device to be strategically located in a way to serve as an anchor for the user, wherein the handle comprises a hollowed cylinder, the connecting member passing through the hollowed cylinder.

2. A device for assisting a user with ingress and egress into and out of automobiles and other modes of transportation, as in claim 1, wherein the handle comprises a fabric wrapped about the connecting member, the fabric serving as structural reinforcement and as padding for the benefit of the user.

3. A device for assisting a user with ingress and egress into and out of automobiles and other modes of transportation, as in claim 1, wherein the adjusting means comprises first and second ends, the first end including a plurality of prong-like members and the second end including a receiving member designed to receive the prong-like members and thereby retain the attaching member in a closed, stable position.

4. A device for assisting a user with ingress and egress into and out of automobiles and other modes of transportation, as in claim 3, wherein the adjusting means further includes means for manually advancing and retracting an end of the attaching member to a desired length.

\* \* \* \* \*